UNITED STATES PATENT OFFICE.

JOHN G. KIRCHEN AND DONALD B. BRADNER, OF TONOPAH, NEVADA.

PROCESS OF EXTRACTING PRECIOUS METALS FROM ORES CONTAINING ALKALINE-EARTH CARBONATES, &c.

1,257,612.　　　　　Specification of Letters Patent.　　Patented Feb. 26, 1918.

No Drawing.　　　Application filed August 8, 1917.　Serial No. 185,189.

*To all whom it may concern:*

Be it known that we, JOHN G. KIRCHEN and DONALD B. BRADNER, citizens of the United States, residing at Tonopah, in the county of Nye and State of Nevada, have invented certain new and useful Improvements in Processes of Extracting Precious Metals from Ores Containing Alkaline-Earth Carbonates, &c., of which the following is a specification.

This invention relates to a process of treating gold or silver ores carrying calcite, limestone, or any alkaline earth carbonates.

A certain class of ores found in the Manhattan district of Nevada have been practically valueless since their discovery, owing to the presence of antimony, arsenical compounds and certain carbonates. It has not hertofore been found possible to reduce these ores and the entire district in which these ores are found, instead of progressing and growing up as a prosperous mining community has become depressed and almost depopulated.

The general object of this invention is to provide a method whereby these ores may be reduced and treated by the cyanid process to secure the precious metals therefrom, and particularly to provide a process whereby the precious metals may be removed from the ore but at such a temperature that limestone, calcite and other alkaline earth carbonates, which are contained in the ores, will not be decomposed by the liberation of carbon dioxid and will therefore remain insoluble in water or cyanid solution.

The process is as follows: The ores which are to be treated are ores carrying gold and silver, stibnite or antimony sulfid, calcite, calcium carbonate and other alkaline earth carbonates. This ore is roasted at a relatively low temperature to free the precious metals in the ore, the temperature being sufficiently high that the sulfids of arsenic and iron are oxidized and part of the sulfid of antimony oxidized but being so low that the limestone, calcite, and the alkaline earth carbonates shall not be decomposed by the liberation of carbon dioxid and will therefore remain insoluble in water or cyanid solution.

We have found by careful experiment that the roasting at a temperature not less than 600° F. approximately and not higher than 1200° F. or preferably not higher than 1150° F. will not cause the liberation of carbon dioxid, but will eliminate the volatile hydrocarbons from any carbonaceous material that may be contained in the ore and that if the roasting temperature is carried over 1150 or 1200° F., caustic lime will be formed which, in the subsequent cyanid treatment, dissolves the partially oxidized antimony sulfid and causes precipitation of the gold. In other words, if the roasting temperature is carried above 1150° F. or 1200° F., the carbon dioxid is liberated from the limestone, calcite, etc., leaving the residue of the limestone, calcite, antimony sulfid, etc., in a soluble condition and, therefore, in a condition to combine with the gold and silver.

The roasting of the ore at a temperature below 1200° F. frees the precious metals from the ore. That is, in the case of sulfids of iron and arsenic, oxidization volatilizes the sulfur so that the gold contained within the sulfids is freed. Of course gold exists in other combinations than with the sulfid minerals, but we have found that roasting between 600° F. and 1200° F. breaks up the combination of gold with other non-sulfid minerals, liberating the gold therefrom and making it free, so that the gold contained in the original arsenic sulfids, iron sulfids or in combination with non-sulfid minerals is placed in a free state so that it is readily soluble in a cyanid solution. Very often graphitic material is contained in the ore and this roasting expels the volatile hydro-carbons which may be contained in the graphitic material.

The process may be applied to the treatment of metallic ores carrying limestone, calcite or other alkaline earth carbonates with antimony sulfid, realgar, orpiment, or other arsenical sulfids, etc., or with non-sulfid minerals, so that the alkaline earth carbonates which are naturally practically insoluble, remain insoluble.

Having described our invention, what we claim is:—

1. A step in the process of extracting precious metals from ores containing calcium carbonate, and other alkaline earth carbonates, consisting in roasting the ore at a temperature sufficient to oxidize the minerals associated with the precious metals but less than that which will liberate carbon dioxid.

2. A step in the process of extracting precious metals from ores containing calcium carbonate, and other alkaline earth carbonates consisting in roasting the ore at a temperature greater than 600° F. but less than 1200° F.

3. The process of extracting precious metals from ores containing calcium carbonate, and other alkaline earth carbonates, consisting in roasting the ore at a temperature greater than 600° F. but less than that which will liberate carbon dioxid and then submitting the calcine to a cyanid treatment.

4. A step in the process of treating ores including precious metals, earth carbonates, which consists in giving a preliminary roast to the ore at a temperature greater than 600° F. but below that wherein the carbonates will be decomposed and rendered soluble.

In testimony whereof we hereunto affix our signatures in the presence of two witnesses.

JOHN G. KIRCHEN.
DONALD B. BRADNER.

Witnesses:
B. W. BOOTH,
ALLIS M. CASE.

Copies of this patent may be obtained for five cents each, by addressing the "Commissioner of Patents, Washington, D. C."